(12) United States Patent
Oyama et al.

(10) Patent No.: US 6,917,835 B2
(45) Date of Patent: Jul. 12, 2005

(54) PROGRAMMABLE CONTROLLER SYSTEM

(75) Inventors: Takeshi Oyama, Osaka (JP);
Katsunari Koyama, Osaka (JP);
Tsuyoshi Kimura, Osaka (JP)

(73) Assignee: Keyence Corporation, Osaka (JP)

( * ) Notice: Subject to any disclaimer, the term of this patent is extended or adjusted under 35 U.S.C. 154(b) by 335 days.

(21) Appl. No.: 09/945,597

(22) Filed: Sep. 4, 2001

(65) Prior Publication Data

US 2002/0062158 A1 May 23, 2002

(30) Foreign Application Priority Data

Oct. 2, 2000 (JP) .................................... P. 2000-339717

(51) Int. Cl.⁷ .............................................. G05B 11/01
(52) U.S. Cl. .............................. 700/17; 700/18; 700/19
(58) Field of Search ............................... 700/17–19, 11, 700/267; 710/1–2, 10, 55, 300; 345/771; 364/138, 200

(56) References Cited

U.S. PATENT DOCUMENTS

| | | | | |
|---|---|---|---|---|
| 4,488,258 A | * | 12/1984 | Struger et al. ................. | 700/18 |
| 4,764,868 A | | 8/1988 | Ketelhut et al. ............ | 364/200 |
| 4,910,658 A | | 3/1990 | Dudash et al. ............... | 364/138 |
| 5,301,346 A | * | 4/1994 | Notarianni et al. ......... | 700/267 |
| 5,802,389 A | * | 9/1998 | McNutt ............................ | 710/1 |
| 6,366,300 B1 | * | 4/2002 | Ohara et al. ................. | 345/771 |
| 6,421,572 B1 | * | 7/2002 | Koyama et al. .............. | 700/83 |
| 2001/0034830 A1 | * | 10/2001 | Seki et al. ..................... | 713/1 |
| 2003/0005196 A1 | * | 1/2003 | Reed ........................... | 710/300 |
| 2003/0105891 A1 | * | 6/2003 | Moriyama ..................... | 710/2 |

FOREIGN PATENT DOCUMENTS

| | | | |
|---|---|---|---|
| EP | 0 434 288 A3 | 6/1991 | .......... G05B/19/05 |
| EP | 0 434 288 A2 | 6/1991 | .......... G05B/19/05 |
| JP | 5-241623 | 9/1993 | |
| JP | 9-16220 | 1/1997 | |
| JP | 2000-214908 | 8/2000 | |
| JP | 2000-242315 | 9/2000 | |

* cited by examiner

*Primary Examiner*—Anthony Knight
*Assistant Examiner*—Ronald D Hartman, Jr.
(74) *Attorney, Agent, or Firm*—Kilyk & Bowersox, P.L.L.C.

(57) ABSTRACT

A CPU unit 2 has a liquid crystal display screen 10, a plurality of operation keys 12, and the like. Each of expansion units 3 to 8 has a push switch button 14. For example, when an operator pushes the switch button 14-1 of the ID-1 unit 3, information concerning the unit 3 is displayed on the liquid crystal screen 10. Next, the operator operates one of the predetermined operation keys 12 of the CPU unit 2, whereby the display contents of the screen 10 are removed and another piece of information concerning the unit 3 is displayed.

9 Claims, 2 Drawing Sheets

PROGRAMMABLE CONTROLLER SYSTEM

BACKGROUND OF THE INVENTION

1. Field of the Invention

The invention relates to a Programmable Logic Controller system (which will hereinafter be referred to as a "PLC system").

2. Description of the Related Art

A PLC system is made of various expansion units such as an I/O unit and a D/A conversion unit as well as a CPU unit. The models and the number of the expansion units are determined as desiredby the operator. The preparation of a control program of the PLC system and various settings for each expansion unit are executed, for example, using a sequence programming tool such as ladder chart creation support software with an external computer.

Japanese Patent Unexamined Publication No. Hei. 5-241623 and Japanese Patent Unexamined Publication No. Hei. 9-16220, propose that an expansion unit such as an I/O unit is provided with display means for blinking LED to check wiring in a constructed PLC system or check the operation of a control system or that a special indicator is connected to a PLC system for checking the I/O state.

In the PLC system in the related art, for example, to check the setting for each expansion unit or when an operation failure is found, generally programs and various settings stored in an external computer are checked, the setup values are corrected using a sequence programming tool such as ladder chart creation support software installed in the computer, and then the corrected programs, and the like, are again down loaded into a CPU unit of the PLC system, and the operation of the PLC system is again checked. Such a process is intricate.

SUMMARY OF THE INVENTION

It is therefore a first object of the invention to provide a PLC system for making it possible to facilitate checking the setup items of each expansion unit.

It is a second object of the invention to provide a PLC system for making it possible to facilitate work involved in correcting or changing various setup items for each expansion unit.

It is a third object of the invention to provide a PLC system for making it possible to prevent a mistake from easily occurring when the setup item of each expansion unit is checked or changed.

It is a fourth object of the invention to provide a comparatively inexpensive PLC system for making it possible to facilitate checking the setup items of each expansion unit.

To these ends, according to the invention, there is provided a programmable logic controller system comprising a CPU unit and a plurality of expansion units connected to the CPU unit. The programmable controller system includes: a memory installed in the CPU unit for storing information on the expansion units separately for each expansion unit; a display installed on the CPU unit for displaying the information on the expansion units stored in the memory; and a selection unit installed on each of the expansion units for selecting the expansion unit to be displayed on the display. In the programmable logic controller system, when the selection unit is activated, the information on the expansion unit designated by the selection unit is read from the memory and the read information is displayed on the display.

According to the above-mentioned programmable controller system, the worker or the operator can operate the selection unit installed on the expansion unit to be monitored, whereby information such as the setup values of the expansion unit is displayed on the display of the CPU unit without providing each expansion unit with a separate display.

Therefore, according to the invention, the information concerning each expansion unit can be monitored in the PLC system, without monitoring information in an external computer in which a sequential programming tool such as a ladder chart is installed, so that checking the information concerning each expansion unit can be facilitated. In addition, according to the invention, the PLC system can be manufactured at low cost as compared with the case where each expansion unit is provided with a display monitor.

According to the invention, preferably, an operation key is installed on the CPU unit and the operator can activate the operation key to switch the display contents of the display of the CPU unit. According to the configuration, if the display is implemented by a comparatively small-sized monitor screen, the information concerning each expansion unit can be displayed in letters, digits, or symbols in an easily readable size.

According to the invention, preferably, the operator can activate the operation key installed on the CPU unit to change the setup value displayed on the display and store the changed setup value in the memory of the CPU unit. According to the configuration, the operator can correct or change the setup value, if necessary, while checking various setup values of each expansion unit displayed on the display screen in the PLC system, without connecting the external computer to the CPU unit.

According to the invention, preferably, each expansion unit is provided with a light display unit. When the light display unit of the selected expansion unit is lighted, the operator can visually check that the expansion unit is being monitored. By comparing the display contents of the expansion unit with the light display unit lighted, the worker or the operator can immediately know visually whether or not the correct unit has been selected, so that erroneous monitoring based on a mistake or erroneous correcting or changing of each setup value can be prevented.

These and other objects and advantages of the invention will become apparent from the following detailed description of the embodiment of the invention.

DETAILED DESCRIPTION OF THE PREFERRED EMBODIMENT

Referring now to the accompanying drawings, there is shown a preferred embodiment of the invention.

Figure 1:
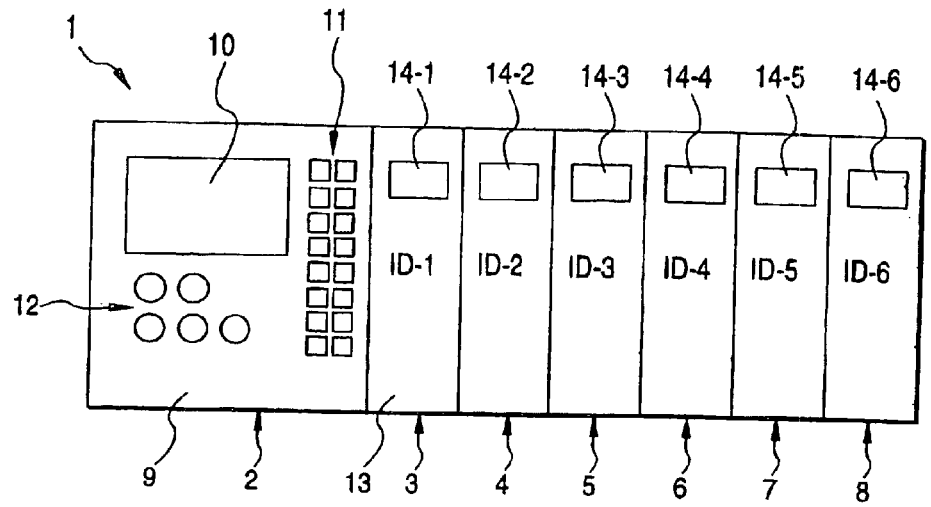
FIG. 1 is a schematic front view of a part of a PLC system of one embodiment of the invention.

FIG. 1 shows a part of a PLC system according to the invention. A PLC system 1 comprises units connected to each other without intervention of a base frame, but the invention is not limited to a system adopting such a connection mode and can also be applied to a PLC system adopting an alternate connection mode, wherein units are connected via a base frame, for example.

The PLC system 1 comprises various expansion units 3 to 8 such as I/O units, different in the number of terminals, a transistor output unit, and a D/A conversion unit in addition to a CPU unit 2. Each of the expansion units 3 to 8 is given a unit ID indicating the order of the expansion unit counted from the CPU unit 2. That is, preferably, the units 3 to 8 are given the ID numbers in such a manner that the unit 3 to the right of the CPU unit 2 is assigned "ID-1," the next unit, 4, is assigned "ID-2" . . . and so on.

The CPU unit 2 has a liquid crystal display screen 10, a plurality of LEDs 11 for displaying the I/O state, a plurality of operation keys 12, etc., on a front panel 9. The CPU unit 2 also comprises an inlet (not shown) for inserting a memory card 22 (FIG. 2) of a storage medium.

Each of the expansion units 3 to 8 has a push switch button 14 on a front panel 13 and the push switch button 14 contains lighting means such as an LED (not shown). Blinking light means can be visually checked from the outside. To discriminate the switch buttons 14 corresponding to the ID-1 to ID-6 units 3 to 8 from each other, suffixes –1, –2, . . . are added to the numeral 14, generically identifying the switch buttons.

Figure 2:
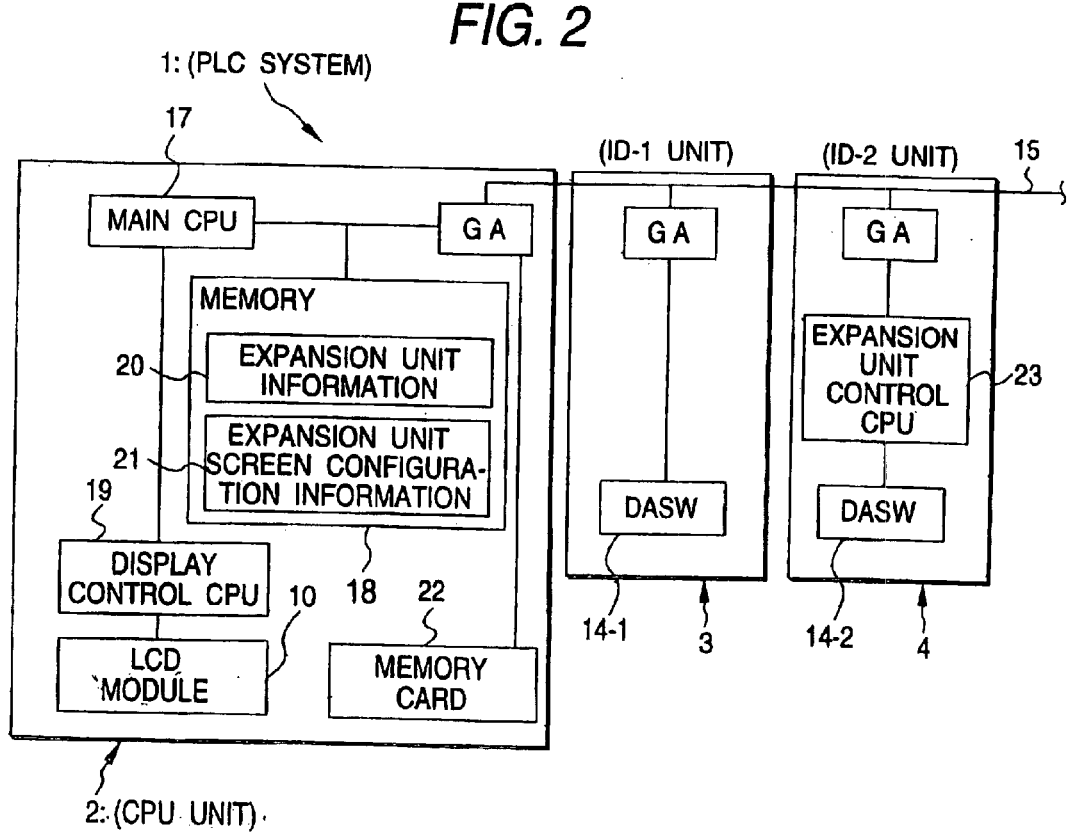
FIG. 2 is a schematic block diagram of the PLC system in FIG. 1.

The CPU unit 2 and the expansion units 3 to 8 are connected by a bus line 15 as shown in FIG. 2. The CPU unit 2 is provided with a display control computer 19 for the liquid crystal screen 10 in addition to other components such as a main CPU 17 and memory 18.

Figure 3:
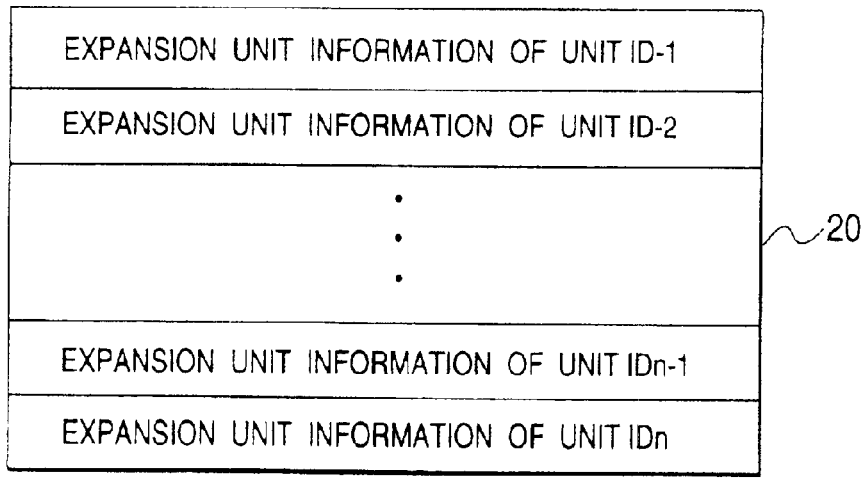
FIG. 3 is a schematic representation illustrating expansion unit data stored in memory of a CPU unit.
Figure 4:
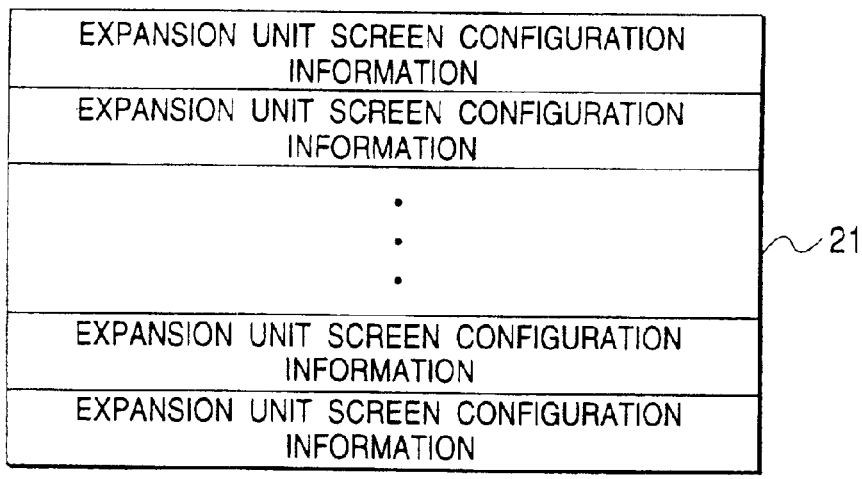
FIG. 4 is a schematic representation illustrating screen configuration information stored in the memory of the CPU unit.

The memory 18, divided for each unit, stores expansion unit information 20 as shown in FIG. 3 in addition to a sequence program. The expansion unit information 20 contains various categories of setup data such as a code representing the type of corresponding expansion unit (for example, a numeric value of 1, 2, or 3 meaning a 16-point input unit, a 32-point input unit, or an D/A conversion unit), the ID number of the unit, a comment, the top number of the devices used by the unit, and the number of the devices used by the unit. Screen configuration information 21 for display on the liquid crystal screen 10 is also stored in the memory 18. As many units of the screen configuration information 21 as the number of the unit types are provided as shown in FIG. 4. The expansion unit information 20 and the screen configuration information 21 are created using ladder chart creation support software, and the like, with an external computer (not shown) and are down loaded into the CPU unit 2 from the external computer. The ID-2 unit is different from ID-1 in that ID-2 is preferably provided with CPU 23 for control purpose, signal processing, or the like. For instance, the ID-2 unit may be an A/D conversion unit or a position determining unit. For example, in the case where the expansion unit ID-2 is an A/D conversion unit, the expansion unit control CPU 23 orders an A/D component (not shown) to convert an analog signal, which was previously transmitted to ID-2, to the corresponding digital signal. In the case where the expansion unit ID-2 is a position determining unit, the expansion unit control CPU 23 receives control parameters for motor operation settings. These parameters are set in the unit by the operator and are used to govern the interval between pulses of a pulse motor, which is connected to the expansion unit.

Usually, the current date and time are displayed on the display screen 10 of the CPU unit 2. To monitor the settings of the expansion units 3 to 8, the operator pushes the corresponding switch button 14 of a selection unit to select the unit to be monitored. That is, for example, to monitor the setup contents of the first (ID-1) unit 3, the operator pushes, namely, turns on, the switch button 14–1 of the ID-1 unit 3. An ON signal generated thereby is sent from the ID-1 unit 3 through the busline 15 to the CPU unit 2. The LED contained in the switch button 14 changes depending on the state of the corresponding expansion unit 3 to 8, as listed below:

|  | Unit normal | Unit abnormal |
| --- | --- | --- |
| Switch button 14 off | Light in green | Light in red |
| Switch button 14 on | Blink in green | Blink in red |

The worker or the operator sees the color and blinking of the switch button 14 and can instantaneously know whether or not the unit is the unit selected for monitoring, in addition to whether or not the unit is operating normally. The LED is contained in the switch button 14 for the operator to visually check the color and light state of the switch button 14 itself. In an alternate embodiment, however, a light display such as an LED separate from the switch button 14 may be placed in each of the expansion units 3 to 8.

For example, if an ON signal is sent from the ID-1 unit 3, the CPU unit 2, which receives the ON signal, reads information concerning the ID-1 unit 3 from the expansion unit information 20 and the screen configuration information 21 in the memory 18 and displays the information concerning the unit 3 on the liquid crystal screen 10 as display.

Figure 5:
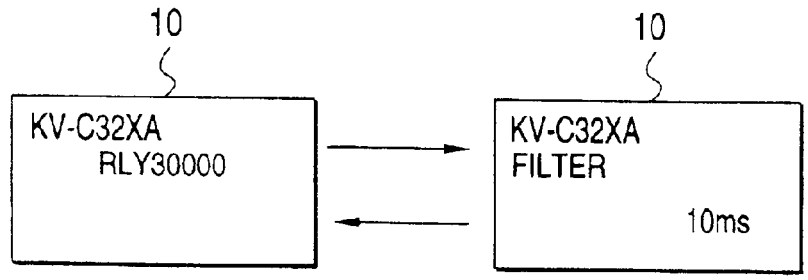
FIG. 5 is a drawing describing the display contents of a screen of the CPU unit and screen change.

FIG. 5 shows exemplary display contents of the liquid crystal screen 10 when the switch button 14-1 is pushed. First, in addition to the model name of the ID-1 unit 3, the relay number assigned to the unit 3 is displayed in text on the liquid crystal screen 10 of the CPU unit 2, as shown at the left of FIG. 5. The state of each relay is also displayed on the LED 11 for I/O state display, installed on the CPU unit 2. Therefore, by comparing the screen 10 of the CPU unit 2 with the light state of the LED 11 for I/O state display, the operator can immediately check at a glance whether or not any desired relay relation has been formed and whether or not the formed relay relation operates normally.

Next, the operator operates one of the predetermined operation keys 12 of the CPU unit 2, whereby the liquid crystal screen 10 is switched to another screen, for example, as shown at the right of FIG. 5. In addition to the model name of the ID-1 unit 3, the input time constant of the unit 3 is displayed on the screen 10 illustrated at the right of FIG. 5.

When the operator thus operates one of the predetermined operation keys 12 as a monitor display switch unit, the display contents of the liquid crystal screen 10 are switched one after another and various setup parameters of the ID-1 unit 3 can be displayed one after another. The worker or the operator can visually check the various setup contents of the ID-1 unit 3 through the liquid crystal screen 10 of the CPU unit 2.

If the operator wants to correct or change the contents displayed on the screen 10, namely, any parameter value or device value of the corresponding unit, the operator can operate one of the predetermined operation keys 12 for correcting or changing the parameter value or device value shown on the screen 10.

To save the corrected screen display contents as data, the operator operates one of the predetermined operation keys 12 for saving the data, whereby a new directory is created on the memory card 22, and post-changed or post-corrected unit configuration information, device value by device type, or the like, in addition to the sequence program, is stored in the new directory.

The external computer (not shown) used to create the ladder chart, etc., is connected to the CPU unit 2, whereby the post-changed data may be rewritten directly into the external computer or the data in the external computer may be overwritten with the post-changed data via the memory card (not shown).

When the operator operates one of the predetermined operation keys 12, the setup contents can be finely adjusted or changed using the screen 10 and the operation keys 12 of the CPU unit 2, and the setup contents are loaded into the memory 18 from the memory card 22 according to an instruction from the main CPU 17 of the CPU unit 2. That is, the operator can select a directory in the memory card 22 while seeing the screen 10 by operating one of the predetermined operation keys 12, and the data in the selected directory is loaded into the memory 18.

Of course, for example, on a line for manufacturing several types of products, a sensor for identifying the type of product flowing on the line may be installed, and when a signal sent from the sensor is received and a tooling change is made, the file (directory) to be loaded into the memory 18 of the CPU unit 2 may be selected automatically out of the memory card 22.

As understood from the description made above, the screen 10 is placed only on the CPU unit 2, rather than on every expansion unit, so that the PLC system with the screen can be manufactured at comparatively low cost.

Since each of the expansion units 3 to 8 is provided with the button switch 14 whose color or light state may change, the button switch 14 activates a state display unit allowing the operator to visually check whether or not each expansion unit operates normally. In addition, the fact that the unit is selected for monitoring on the screen 10 of the CPU unit 2 is indicated by the button switch 14 installed on the unit itself, whereby the worker or the operator can visually compare the monitor display contents of the screen 10 of the CPU unit 2, with the visual state of the button switch 14 of the selected unit, thereby visually confirming whether or not the correct unit has been selected, namely, whether or not the worker or the operator has selected the correct unit. Therefore, erroneous monitoring based on a mistake can be prevented.

Since the setting of each of the expansion units 3 to 8 can be finely adjusted or changed with the CPU unit 2, the need for work such as connecting the external computer and the CPU unit 2 formerly required can be eliminated and the work involved in changing the setting can be reduced.

The memory card 22 can be used to easily overwrite the data in the external computer with the data corrected with the CPU unit 2, without connecting the external computer to the CPU unit 2, so that work for matching various pieces of information stored in the CPU unit 2 with the information stored in the external computer can be performed comparatively easily.

What is claimed is:

1. A programmable logic controller system comprising:
   a) a CPU unit which comprises:
      a memory for storing information on expansion units separately for each expansion unit, wherein the information includes at least information representing a corresponding expansion unit ID number and type, and wherein the information on each of the expansion units contains various setup values of the expansion units, and wherein the memory stores screen configuration information that corresponds to each type of expansion unit, and wherein the information of the expansion units includes a parameter whose setup value is changeable;
      a display for displaying the information on the expansion units stored in the memory; and
      an operation key for selecting the information displayed on the display, wherein when an operation key is activated, the setup values of the selected expansion unit are displayed on the display and are changeable, and when changed, the changed setup values are stored in the memory; and
   b) a plurality of expansion units, including al least one I/O unit, wherein at least two of the expansion units are different in type from one another, and which are connected to the CPU unit, wherein each of the expansion unit comprises:
      a selection button, disposed on each of the expansion units, for selecting one of the expansion units, wherein information corresponding to a selected expansion unit is read from the memory and the information read is displayed on the display based on the screen configuration information corresponding to the selected type of expansion unit.

2. The programmable logic controller system as claimed in claim 1, wherein each of said expansion units further comprises:
   a light display unit for operating a light corresponding to the input to the selection unit of the relevant expansion unit.

3. The programmable logic controller system as claimed in claim 1, wherein each of said expansion units further comprises:
   a light, and a light display unit operating the light corresponding to the expansion unit, and indicating the operational status of the expansion unit.

4. The programmable logic controller system as claimed in claim 1, wherein the CPU unit further comprises:
   a detachable storage medium for storing the changed setup value.

5. The programmable controller system as claimed in claim 4, wherein when the operation key is operated, a new directory is created in the storage medium, the changed setup value is stored in the new directory, and the expansion unit is controlled based on the changed setup value.

6. The programmable logic controller system as claimed in claim 1, wherein said CPU unit includes a front panel, and wherein said display is disposed on said front panel.

7. The programmable logic controller system as claimed in claim 1, wherein said memory for storing information stores information on said expansion units and stores screen configuration information on said display for displaying, wherein said display corresponds to each of said expansion units.

8. The programmable logic controller system as claimed in claim 1, wherein said memory for storing information includes information on said expansion units, a comment, the top number of devices used by said expansion unit, and the number of devices used by said expansion unit.

9. The programmable logic controller system as claimed in claim 1, wherein at least two I/O units have a different number of terminals from one another.

* * * * *